US012780219B2

(12) United States Patent
Alexander

(10) Patent No.: US 12,780,219 B2
(45) Date of Patent: Nov. 3, 2026

(54) DATA SAFETY OBSERVER SYSTEM

(71) Applicant: Applied Electric Vehicles Ltd, Scoresby (AU)

(72) Inventor: Marc Alexander, Croydon Hills (AU)

(73) Assignee: Applied Electric Vehicles Ltd, Scoresby (AU)

( * ) Notice: Subject to any disclaimer, the term of this patent is extended or adjusted under 35 U.S.C. 154(b) by 165 days.

(21) Appl. No.: 18/769,578

(22) Filed: Jul. 11, 2024

(65) Prior Publication Data

US 2026/0014995 A1 Jan. 15, 2026

(51) Int. Cl.

*B60W 50/00* (2006.01)
*B60R 16/023* (2006.01)
*B60W 50/02* (2012.01)

(52) U.S. Cl.

CPC ..... *B60W 50/0098* (2013.01); *B60R 16/0231* (2013.01); *B60W 50/02* (2013.01)

(58) Field of Classification Search

CPC .............. B60W 50/0098; B60W 50/02; B60R 16/0231

See application file for complete search history.

(56) References Cited

U.S. PATENT DOCUMENTS

2012/0062743 A1* 3/2012 Lynam .................. B60Q 9/005 348/148
2018/0144640 A1* 5/2018 Price .................... B60R 16/0231
2019/0056736 A1* 2/2019 Wood .............. B60W 60/00256
2021/0039669 A1* 2/2021 Watson ................ G06V 20/588
2022/0055664 A1* 2/2022 Koopman, Jr. ....... B60W 40/08
2022/0126864 A1* 4/2022 Moustafa .......... B60W 60/0013
2023/0192138 A1* 6/2023 Lee .................. B60W 60/0059 701/23
2023/0242153 A1* 8/2023 Donderici ......... B60W 50/0097 701/36
2025/0289443 A1* 9/2025 Alexander .......... G06F 11/0739
2026/0014995 A1* 1/2026 Alexander .......... B60R 16/0231

FOREIGN PATENT DOCUMENTS

KR 102670950 B1 * 6/2024 ............ B60W 40/02

OTHER PUBLICATIONS

KR-102670950-B1 translation (Year: 2024).*

* cited by examiner

*Primary Examiner* — Kyle T Johnson
(74) *Attorney, Agent, or Firm* — FIG. 1 Patents

(57) ABSTRACT

A data safety observer system is described. In one or more implementations, a method includes executing at least one application that generates parameter data to cause a vehicle operation performed by at least one vehicle subsystem coupled to a vehicle network, conducting an integrity check on the parameter data that verifies whether the parameter data will cause the vehicle operation to maintain a safety envelope around the vehicle, responsive to determining that the parameter data does not satisfy the integrity check by verifying that the parameter data will not cause the vehicle operation to maintain the safety envelope around the vehicle, modifying the parameter data such that the vehicle safety envelope is maintained during performance of the vehicle operation, and outputting the modified parameter data on the vehicle network for causing the vehicle subsystem to perform the vehicle operation in a way that maintains the vehicle safety envelope.

18 Claims, 5 Drawing Sheets

DATA SAFETY OBSERVER SYSTEM

BACKGROUND

Autonomous and semi-autonomous vehicle technology, including both hardware and software systems, is advancing rapidly. Maintaining safety despite failures of these systems is important. Many current systems are engineered to fail-silent or fail-safe, but these safety strategies may not ensure a minimum safe condition for the vehicle if a system failure is experienced. As an example, a fail-safe strategy may include a controlled deceleration of a vehicle, but the vehicle may remain in the flow of traffic. Better safety strategies and safeguards are desired as this technology proliferates.

DETAILED DESCRIPTION

Figure 1:
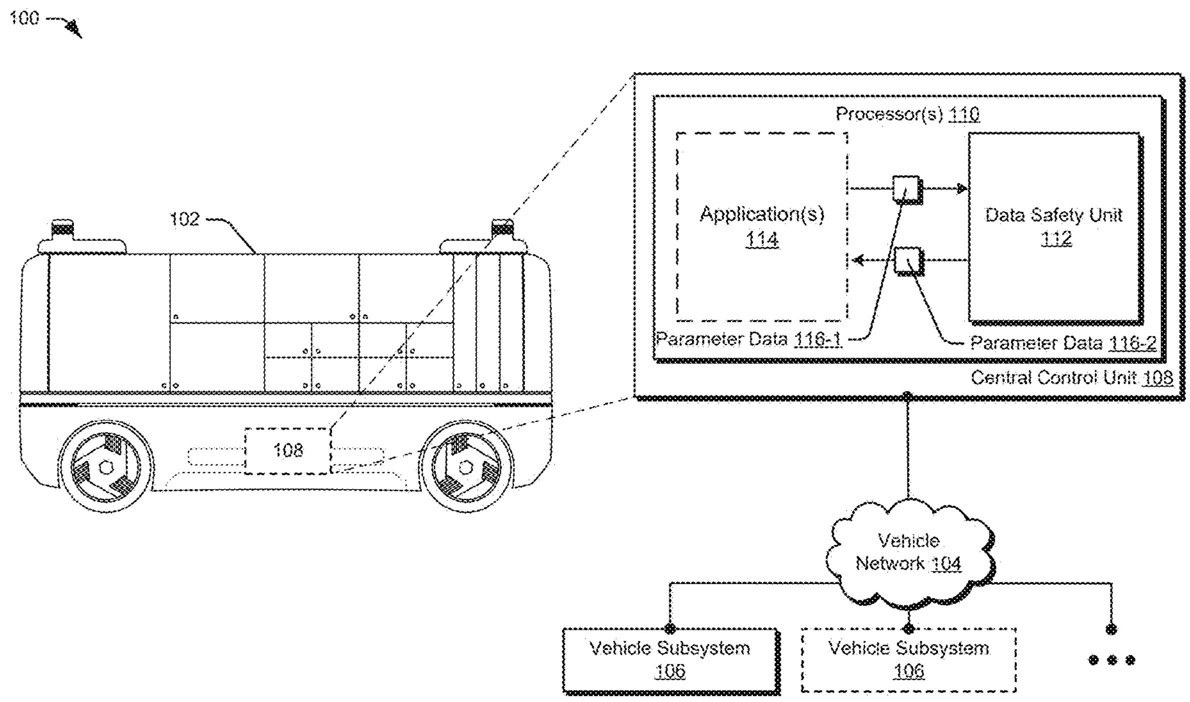
FIG. 1 is a block diagram of a non-limiting example environment including a vehicle having a data safety observation system that filters data for safe vehicle operation.

Many different safety strategies can be implemented in various electronic systems installed in modern vehicles. Some of these safety strategies involve shutting a failed or faulty system down if the system has a low functional safety risk, while other strategies involve hardware and/or software redundancy when the functional safety risk is higher. In some jurisdictions, vehicle safeguards are mandated by traffic laws. For example, these traffic laws reference various safety standards that vehicles are required to adopt to reduce risk and promote safety of occupants, other vehicles, and pedestrians.

The international organization of standardization (ISO) publishes the ISO standard 26262 titled "Road vehicles—Functional Safety." This standard defines a set of functional safety requirements of different electronics and electrical systems in a vehicle. In some jurisdictions, adherence to this standard is a condition for allowing a vehicle to operate on a road. The standard assigns an Automotive Safety Integrity Level (ASIL) to each part or function of a vehicle. There are four different ASILs including ASIL-A, which is assigned to vehicle functions and parts that present a lowest risk to safety, and ASIL-D, which is assigned to vehicle functions and parts that present a highest safety risk. ASIL-D is used for vehicle components involved in high exposure driving situations where malfunctions cause vehicles to be difficult to control, which can lead to death or major bodily harm.

Fail-safe and fail-silent safety strategies can be employed on vehicle functions that are rated with lower integrity levels (e.g., ASIL-A). These safety strategies allow a functional component to fail without automated redundancy. The component may either become communicatively silent or the failed functionality may be easily bypassed by human intervention. For example, a failure of caution taillights (as opposed to braking taillights) of a vehicle is generally considered to have a low risk factor and a fail-safe or fail-silent strategy can be implemented.

In contrast to the fail-safe and fail-silent strategies, a fail-operational strategy is required for achieving higher integrity levels of risk (e.g., ASIL-D) and utilizes hardware redundancy and/or automated software systems to maintain operational functionality until a safety goal is achieved. The safety goal relates to maintaining a physical boundary around the vehicle and a safe operating envelope along the path in front of the vehicle by performing a minimum risk maneuver that results in a minimum safe condition of the vehicle. For example, during a component fault or failure of a critical system while a vehicle is traversing a lane with traffic, the minimum risk maneuver is designed to navigate the vehicle to a safe area (e.g., a median or a side road out of traffic) before decelerating to a stop. Accomplishing this strategy is challenging due to the many electronic components (e.g., semiconductor chips, capacitors, or resistors), power systems, and complex control units that fail. Conventionally, diversity and redundancy of these components and systems have been used, but these solutions are limited. Particularly, some faults go undetected and corrupted data is propagated to vehicle subsystems. Providing a higher safety integrity scope that compensates for undetected faults and allows lower safety integrity elements to function enables a safer driving experience despite hardware and/or software failures.

A data safety observer system is described. A vehicle control unit (e.g., processor) operable to manage and control subsystems (e.g., edge devices) of a vehicle includes a data safety unit as a physical logic block. The data safety unit receives or intercepts parameter data from an application before the parameter data is propagated on a vehicle network to act as a hardware filter for the parameter data. Non-limiting examples of the parameter data include operational and/or state values such as velocity, steering angles, traction, torque, and the like. The parameter data is used by the vehicle control unit and the subsystems to operate and maneuver the vehicle. The data safety unit is configured to provide data rationality and plausibility to the parameter data, such as minimum-maximum range checks, changes in value thresholds, and correlation between one data point and another. The data safety unit verifies and checks the integrity of the parameter data, remains silent when the parameter data satisfies the integrity check and the unchanged parameter data is output to the vehicle network.

When the integrity check is not satisfied such that a vehicle safety envelope will not be maintained during performance of the vehicle operation, the data safety unit modifies the parameter data to enable maintenance of the vehicle safety envelope during the performance of the vehicle operation. The modified parameter data is then output to the relevant vehicle subsystem via the vehicle network. In this manner, the data safety unit provides a layer of safety integrity that safeguards against hardware and software faults that are otherwise undetectable. A fail-operational strategy is enabled that ensures both the passenger(s) and the vehicle have a greatest likelihood of reaching a minimum safe condition during hardware and/or software failures. It should be understood that the integrity check is performable to improve safety of non-motion related functions as well. For example, an automatic window of overcurrent protection is generating incorrect sensor feedback. When the integrity check is not satisfied such that the overcurrent protection will not be maintained, the data safety unit modifies the parameter data to enable maintenance of the overcurrent protection during the automatic window.

In at least one aspect, the data safety unit is a data safety observer engine implemented in a semiconductor package, similar to other complex peripherals (e.g., a floating-point unit or a serial peripheral interface). The data safety unit has at least one array of registers and, in some instances, includes two or more arrays of registers that operate in a lockstep process. Operating multiple arrays of registers in lockstep enables the removal of undetected hardware faults present in one or more of the registers. The data stored in each array of registers is compared to the data stored in the other arrays of registers as part of the integrity check. Alternatively or additionally, a data safety unit is included in more than one processor on the control unit or included in another system that is external to the control unit.

In one or more implementations, a hardware-based exception handler is also implemented within the data safety unit. In one or more aspects, the exception handler includes a counter and timer circuit configured to implement fault tolerance time interval type responses. If abnormalities or faults are detected due to performing the integrity check on the parameter data, for instance, then in at least one implementation the data safety unit throws an exception alerting the application or the subsystem of the fault (e.g., as a fault tolerance time interval type response). However, because the data safety unit modifies parameter data that does not satisfy the integrity check, safe operation of the vehicle continues, at least until a minimum safe condition is met. If the abnormality or fault is spurious, then the vehicle continues to operate in a safe manner once the parameter data returns to safe values.

Although described in the context of vehicle systems used in vehicle industries, the methods, systems, and devices described herein are beneficial to other industries in which a system with a higher safety integrity scope is desired to provide added protection against hardware and software faults. For example, a power plant uses the data safety observer system to safely control power generation components used to generate power. Likewise, the methods, systems, and devices as described herein are advantageous to data centers, factories, mills, foundries, and the like, to maintain a high safety integrity level.

In some aspects, the techniques described herein relate to a method including: executing, by a processor communicatively coupled to a vehicle network, at least one application that generates parameter data to cause a vehicle operation performed by at least one vehicle subsystem coupled to the vehicle network, conducting, by the processor, an integrity check on the parameter data that verifies whether the parameter data will cause the vehicle operation to maintain a safety envelope around the vehicle, responsive to determining that the parameter data does not satisfy the integrity check by verifying that the parameter data will not cause the vehicle operation to maintain the safety envelope around the vehicle, modifying, by the processor, the parameter data such that the vehicle safety envelope is maintained during performance of the vehicle operation, and outputting, by the processor, the modified parameter data on the vehicle network for causing the vehicle subsystem to perform the vehicle operation in a way that maintains the vehicle safety envelope.

In some aspects, the techniques described herein relate to a method wherein the parameter data includes first parameter data, the method further including: responsive to determining that additional parameter data satisfies the integrity check by verifying that the additional parameter data will cause the vehicle operation to maintain the safety envelope around the vehicle, refraining, by the processor, from modifying the additional parameter data, and outputting, by the processor, the additional parameter data on the vehicle network for causing the vehicle subsystem to perform the vehicle operation.

In some aspects, the techniques described herein relate to a method wherein causing the vehicle subsystem to perform the vehicle operation in a way that maintains the vehicle safety envelope includes performing at least one minimum risk maneuver that results in a minimum safe condition of the vehicle.

In some aspects, the techniques described herein relate to a method, further including: using, by the processor, a data safety unit coupled to the processor to intercept the parameter data prior to being output on the vehicle network, wherein determining whether the parameter data satisfies the integrity check includes causing the data safety unit to perform the integrity check on the intercepted parameter data.

In some aspects, the techniques described herein relate to a method wherein determining whether the parameter data satisfies the integrity check includes: storing, by the processor, the parameter data within at least one array of registers included in the data safety unit, and responsive to storing the parameter data within the array of registers, receiving, by the processor, data from the data safety unit that indicates whether the parameter data stored within the array of registers satisfies the integrity check.

In some aspects, the techniques described herein relate to a method wherein: the at least one array of registers includes multiple arrays of registers included in the data safety unit and operating in lockstep, storing the parameter data within the at least one array of registers includes storing mirror copies of the parameter data in each of the multiple arrays of registers, and data from the data safety unit indicates whether each of the mirror copies of the parameter data satisfies the integrity check.

In some aspects, the techniques described herein relate to a method wherein receiving data from the data safety unit includes receiving a reason for the parameter data not satisfying the integrity check, the method further including: notifying, by the processor, the application or the vehicle subsystem about the reason for the parameter data not satisfying the integrity check by outputting an exception on the vehicle network instructing the application or the vehicle subsystem the reason for the parameter data not satisfying the integrity check.

In some aspects, the techniques described herein relate to a method wherein modifying the parameter data such that the vehicle safety envelope is maintained includes at least one of: clipping a portion of the parameter data to a threshold value for maintaining the vehicle safety envelope, setting a portion of the parameter data to a fixed value for maintaining the vehicle safety envelope, or setting a portion of the parameter data to a previous value of the parameter data that satisfied the integrity check.

In some aspects, the techniques described herein relate to a method wherein determining whether the parameter data satisfies the integrity check includes using one or more of a predetermined rationality, plausibility, proportionality, or correlation factor to verify whether at least one of: portions of the parameter data satisfy an acceptable range of values associated with the parameter data, the portions of the parameter data satisfy an acceptable change in values relative to previous values obtained from corresponding portions of previous parameter data, or the portions of the parameter data satisfy a minimum value or a maximum value associated with the parameter data.

In some aspects, the techniques described herein relate to a system including: at least one vehicle subsystem configured to perform at least one vehicle operation based on parameter data received from a vehicle network, and a processor communicatively coupled to the vehicle network and operable to: execute at least one application that generates the parameter data, conduct an integrity check on the parameter data that verifies whether the parameter data will cause the vehicle operation to maintain a vehicle safety envelope around the vehicle, responsive to determining that the parameter data does not satisfy the integrity check by verifying that the parameter data will not cause the vehicle operation to maintain the safety envelope around the vehicle, modify the parameter data such that the vehicle safety envelope is maintained during performance of the vehicle operation, and output the modified parameter data on the vehicle network for causing the vehicle subsystem to perform the vehicle operation in a way that maintains the vehicle safety envelope, and responsive to determining that the parameter data satisfies the integrity check by verifying that the parameter data will cause the vehicle operation to maintain the safety envelope around the vehicle, refrain from modifying the parameter data, and output the parameter data on the vehicle network for causing the vehicle subsystem to perform the vehicle operation.

In some aspects, the techniques described herein relate to a system wherein causing the vehicle subsystem to perform the vehicle operation in a way that maintains the vehicle safety envelope includes performing at least one minimum risk maneuver that results in a minimum safe condition of the vehicle.

In some aspects, the techniques described herein relate to a system further including: a data safety unit operatively coupled to the processor and configured to perform the integrity check.

In some aspects, the techniques described herein relate to a system, wherein the processor and the data safety unit are implemented on a single system on chip, or the processor and the data safety unit are implemented on different chips.

In some aspects, the techniques described herein relate to a system, wherein the data safety unit includes: at least one array of registers operable to store the parameter data, an observation unit operable to implement the integrity check of the parameter data based on values of the parameter data stored within the array of registers, and an exception-handler unit operable to output data that indicates whether the parameter data stored within the array of registers satisfies the integrity check.

In some aspects, the techniques described herein relate to a system, wherein the at least one array of registers includes multiple arrays of registers included in the data safety unit, storing the parameter data within the at least one array of registers includes storing mirror copies of the parameter data in each of the multiple arrays of registers, and data from the exception-handler unit indicates whether each of the mirror copies of the parameter data satisfies the integrity check.

In some aspects, the techniques described herein relate to a system, wherein when the data from the exception-handler unit indicates a reason for the parameter data not satisfying the integrity check, the processor is operable to notify the application or the vehicle subsystem about the reason for the parameter data not satisfying the integrity check by outputting an exception on the vehicle network instructing the application or the vehicle subsystem the reason for the parameter data not satisfying the integrity check.

In some aspects, the techniques described herein relate to a system, further including latching the modified parameter data in the at least one array of registers until the at least one application outputs the parameter data to be within a threshold value.

In some aspects, the techniques described herein relate to a system, wherein the data safety unit modifies the parameter data such that the vehicle safety envelope is maintained includes at least one of: clipping a portion of the parameter data to a threshold value for maintaining the vehicle safety envelope, setting a portion of the parameter data to a fixed value for maintaining the vehicle safety envelope, or setting a portion of the parameter data to a previous value of the parameter data that satisfied the integrity check.

In some aspects, the techniques described herein relate to a processing device including: a processor core including a network interface with at least one subsystem that performs at least one operation based on parameter data received from the processor core, and a data safety unit operatively coupled to the processor core and configured to intercept the parameter data from the network interface to determine whether the parameter data satisfies an integrity check, the processor core being operable to: execute at least one application that generates the parameter data, cause the data safety unit to conduct an integrity check on the parameter data that verifies whether the parameter data will cause a safety envelope to be maintained during performance of the operation, responsive to the parameter data not satisfying the integrity check by verifying that the parameter data will not cause a safety envelope to be maintained during performance of the operation: modify the parameter data such that a safety envelope is maintained during performance of the operation, and output the modified parameter data to the network interface for causing the subsystem to maintain the safety envelope while performing the operation, and responsive to the parameter data satisfying the integrity check by verifying that the parameter data will cause a safety envelope to be maintained during performance of the operation: refrain from modifying the parameter data, and output the parameter data to the network interface for causing the subsystem to maintain the safety envelope while performing the operation.

In some aspects, the techniques described herein relate to a processing device, wherein the processing device and the data safety unit are implemented within a single semiconductor package.

FIG. 1 is a block diagram of a non-limiting example environment 100 including a vehicle having a data safety observation system that filters data for safe vehicle operation. The environment 100 includes any type of vehicle operating environment, such as a roadway, a traffic scenario, an off road area (e.g., a construction site, a mining operation, or a recreational area), in the air, on or in the water, on or in other substances (e.g., within fluids and/or cellular material), in space, and other public or private spaces, to name a few. The environment 100 includes a vehicle 102, including any type of vehicle such as ground vehicles (e.g., trucks, cars, vans, tractor-trailers, or tanks), air vehicles, rail vehicles, marine vehicles, space vehicles, or other vehicle types. The vehicle 102 in at least one example is unmanned (e.g., autonomously controlled or remotely controlled), and in at least one other example the vehicle 102 is manned (e.g., semi-autonomously controlled or at least partially human operated).

The vehicle 102 includes a vehicle network 104 that operatively couples a plurality of vehicle subsystems 106 to a central control unit 108. For example, the vehicle subsystems 106 represent a plurality of edge devices on the vehicle 102, which are in communication with the vehicle network 104 and the central control unit 108 to control vehicle components that operate in coordination to execute vehicle operations based on the network communication.

The vehicle network 104 is implemented as a wireless or wired network for communicating vehicle data throughout the vehicle 102. Each of the vehicle subsystems 106 and the central control unit 108 share interfaces (e.g., connections) to the vehicle network 104 for exchanging vehicle data (e.g., operating data, parameter data, signals, or commands) throughout the vehicle 102. For example, each of the vehicle subsystems 106 and the central control unit 108 includes a network interface adapter (not shown) that is operable to transmit and receive data via the vehicle network 104. Various types of connections between the vehicle network 104 and the components of the vehicle 102 are usable on the vehicle 102. For example, the connections to the vehicle network 104 include wired connections including, but not limited to, Ethernet connections or links, memory channels, buses (e.g., a data bus, a system or address bus, a controller area network, or CAN bus), interconnects, through silicon vias, traces, pins and sockets, and planes, to name just a few. Other example connections include optical connections, fiber optic connections, and/or connections or links based on quantum entanglement.

Examples of the vehicle subsystems 106 include but are not limited to a propulsion or motion subsystem (e.g., providing motion control), a drive subsystem (e.g., providing autonomous or semi-autonomous motion control), a transmission subsystem, a powertrain subsystem, a human machine interface (HMI) subsystem (e.g., for receiving driver input, for receiving occupant input, or for controlling in-vehicle infotainment), a remote entry or remote start subsystem, a braking subsystem (e.g., providing brake control), an electronic stability control (ECM) subsystem, and a communication subsystem for handling on-board and/or offboard communications (e.g., data and telemetry, vehicle-to-vehicle, vehicle-to-everything, cellular, or Bluetooth), to name just a few. Further examples of the vehicle subsystems 106 include but are not limited to an advanced driving and safety subsystem (ADAS), a perception sensor subsystem (e.g., providing sensor fusion, enabling radar based control, enabling lidar based control, enabling camera based control, or enabling other sensor based control) a steering subsystem (e.g., providing steering control), a body control subsystem (e.g., for controlling cabin environment conditions, for controlling vehicle lights, for controlling vehicle doors and latches, for controlling precipitation wipers, or for controlling power and/or climate controlled seating,), an active suspension subsystem, a fuel management subsystem, a battery management subsystem (e.g., providing traction energy or managing battery usage and charging control), a power distribution subsystem, alarm subsystem, payload subsystem, and extensible-assembly control subsystem (e.g., pod control or exterior tool control), and any other electronic based subsystem of the vehicle 102 that is controllable by the central control unit 108. In at least one aspect, the central control unit 108 includes one or more of the subsystems 106 within an enclosure or contained on an assembly of the central control unit 108. In other words, the subsystems 106 and corresponding edge devices are either internal or external to the central control unit 108. For example, the central control unit 108 includes a low voltage power distribution unit as an internal edge device that controls and maintains the integrity of low-voltage or system power connections to edge devices of the vehicle subsystems 106.

The central control unit 108 is susceptible to faults and errors occurring while the vehicle 102 is driving. These faults and errors occur because of harsh driving environments, vehicle wear, part failure, or other reasons. A hardware or software fault or error at the central control unit 108, which is allowed to propagate into the vehicle network 104 as an incorrect command to one or more of the vehicle subsystems 106, causes incorrect vehicle operations in some instances, which presents a risk to safety. To reliably control the vehicle subsystems 106 in a safe way, even in the presence of faults and errors, the central control unit 108 includes at least one processor 110 with a data safety unit 112, which is a logic block occupying a portion of the processor 110 (e.g., using a core of the processor 110). Alternatively, the data safety unit 112 is implemented within its own semiconductor package, separate from the processor 110. The processor 110 is operable to execute at least one application 114 that provides operation and control functionality for the vehicle 102.

In accordance with the described techniques, the processor 110 controls the motion and vectoring of the vehicle 102. In other words, the processor 110 maintains an operating state of the vehicle 102 (e.g., the vehicle's position and location) within a safe operating envelope of the vehicle 102 by utilizing the data safety unit 112. As used herein, the term "safe operating envelope" refers, for example, to a boundary around the vehicle within which other objects (e.g., other vehicles, property, or people) are not present, adherence to a safe path within tolerances, and operation within performance parameters, to name just a few. In aviation, an aircraft's performance envelope is a similar term, and is used interchangeably with safe operating envelope when the vehicle is aircraft.

Examples of the processor 110 of the central control unit 108 and/or the vehicle subsystems 106 include but are not limited to a central processing unit (CPU), a graphics processing unit (GPU), a field programmable gate array (FPGA), an accelerator, an accelerated processing unit (APU), and a system on chip (SoC), a microcontroller, an electronic control unit (ECU), and a digital signal processor (DSP), to name a few. In one or more variations, the processor 110 of the central control unit 108 and/or the vehicle subsystems 106 include multiple co-processors, multiple cores (e.g., a multi-core processor). In one or more other variations, the processor 110 of the central control unit 108 and/or the vehicle subsystems 106 include a single core (e.g., a single processor core).

In one or more implementations, the central control unit 108 is an electronic control unit or "ECU," or the central control unit 108 is included in an electronic control unit. Thus, in at least one implementation, the processor 110 is included as part of, or in, a single electronic control unit. This contrasts with conventional architectures that include a distributed network of multiple electronic control units disposed throughout the vehicle, such as an architecture having individual electronic control units for each vehicle subsystem or having ECUs for many such vehicle subsystems.

Further, in at least one implementation, the central control unit 108 includes multiple instances of the processor 110, such as two or more identical processors or two or more processors of different types. In such implementations, each instance of the processor 110 is configured to redundantly operate the vehicle 102, including each instance of the processor 110 executing a version of the application 114. For instance, each of the processors 110 is configured to receive the same inputs from perception devices and/or systems of the vehicle 102, perform vectoring computations in the same manner, output the same motion control commands based on same vectoring computations, and so forth. In this way, in the event a first instance of the processor 110 fails or experiences an issue or malfunction that could impact safety, a second instance of the processor 110 seamlessly assumes control of the vehicle 102.

In at least one example, the memory of the central control unit 108 and/or the vehicle subsystems 106 corresponds to or includes volatile memory, examples of which include random-access memory (RAM), dynamic random-access memory (DRAM), synchronous dynamic random-access memory (SDRAM), static random-access memory (SRAM), and memristors. The memory of each of the central control units 108 and/or the vehicle subsystems 106 is configurable with any number of memory (e.g., physical memory) without departing from the spirit or scope of the described techniques. Alternatively or in addition, the memory of each of the central control unit 108 and/or the vehicle subsystems 106 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). Further examples of memory configurations include low-power double data rate (LPDDR), also known as LPDDR SDRAM. The memory of each of the central control unit 108 and/or the vehicle subsystems 106 is configurable in a variety of ways capable of supporting vehicle controls.

The data safety unit 112 receives parameter data 116-1 from the application 114 that is being executed by the processor 110. The parameter data 116-1 includes data received from the vehicle subsystems 106 or data calculated by the application 114 for controlling the motion and vectoring of the vehicle 102, maintaining the operating state of the vehicle 102, and the like. The parameter data 116-1 is stored in at least one array of registers within the data safety unit 112. An observation unit within the data safety unit 112 conducts an integrity check on the parameter data 116-1. In some examples, the parameter data 116-1 is stored as mirror copies in multiple arrays of registers that operate in a lockstep process. The multiple arrays of registers are included within a single data safety unit 112. In at least one case, they are included within separate data safety units 112 operating as redundant units. The integrity check uses a predetermined rationality, plausibility, proportionality, or correlation factor to determine whether the parameter data 116-1 satisfies the integrity check. For example, the observation unit compares all or portions of the parameter data 116-1 to acceptable ranges of values associated with the relative parameter data 116-1, to acceptable changes in values associated with the relative parameter data 116-1, or to a minimum value or a maximum value associated with the parameter data 116-1. Additionally, the observation unit compares one array of registers to the other arrays of registers to safeguard against potential hardware faults internal to the data safety unit 112.

Once the observation unit determines that the parameter data 116-1 does not satisfy the integrity check, the parameter data 116-1 is modified by the observation unit into the parameter data 116-2 to maintain a vehicle safety envelope using different methods depending on the type of parameter data 116-1 that did not satisfy the integrity check. In generating the parameter data 116-2, the observation unit clips a portion of the parameter data 116-1 to a threshold value, in one example, and sets a portion of the parameter data 116-1 to a fixed value in another example. The observation unit sets a portion of the parameter data 116-1 to a previous value that did satisfy the integrity check in other examples of generating the parameter data 116-2. The observation unit also decides to latch or not latch the modified values into the registers. For example, if the portion of the parameter data 116-1 that did not satisfy the integrity check was determined to be a spurious event, then the observation unit elects not to latch the modified parameter data 116-2. In cases where the event was determined to be a system failure, the observation unit elects to latch the modified parameter data 116-2. If the parameter data 116-1 does satisfy the integrity check, then the observation unit refrains from modifying the parameter data 116-1 into the modified parameter data 116-2. Once the integrity check is performed, the parameter data 116-2 is output to the vehicle network 104 or to the application 114.

In one or more implementations, the data safety unit 112 also includes an exception handler. The exception handler outputs an indication that the parameter data 116-1 either satisfied or did not satisfy the integrity check. In some implementations, this indication also includes a reason (e.g., fault code) as to why the parameter data 116-1 did not satisfy the integrity check.

The semi-conductor implementation of the data safety unit 112 provides a hardware filter and quality detector for critical data (e.g., parameter data 116) being propagated throughout the vehicle network 104. Analysis of and modifications to the data is performed in a deterministic, real-time manner and at an integrity level above conventional hardware and software solutions. This results in safer and more trusted operations despite hardware and/or software faults or failures. In one or more aspects, supporting software (e.g., an integrated development environment) is deployed to facilitate implementation of the data safety unit 112, including a user interface to allow users to more easily configure and setup the data safety unit 112 for operating on the vehicle network 104.

Figure 2:
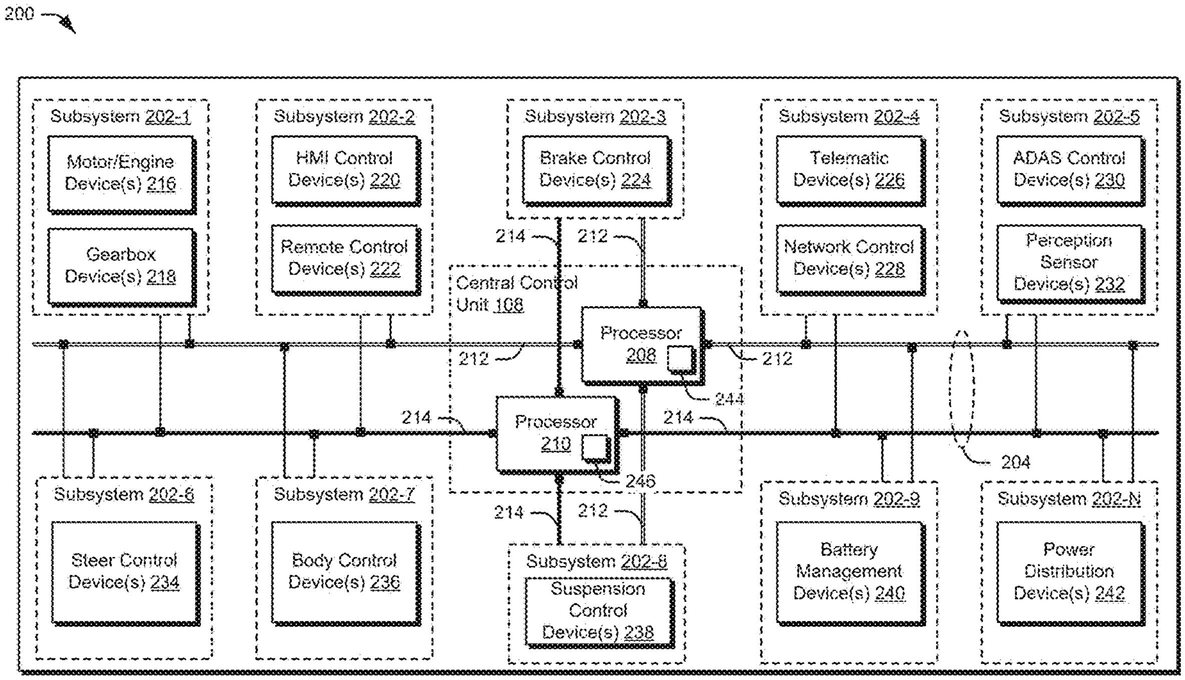
FIG. 2 is a block diagram of a non-limiting example of a vehicle system that implements a data safety observation system for safe vehicle operation.

FIG. 2 is a block diagram of a non-limiting example of a vehicle system 200 that implements a data safety observation system for safe vehicle operation. For ease of description, the vehicle system 200 is described in the context of the environment 100 shown in FIG. 1 including with reference to similar labeled elements. For example, the vehicle system 200 includes a central control unit 108. The vehicle system 200 includes a plurality of subsystems 202 (labeled individually as subsystem 202-1 through subsystem 202-N, where N is any integer) that are managed by the central control unit 108 to implement various vehicle functions. In at least one example, the vehicle system 200 includes additional or fewer subsystems than the subsystems 202 depicted in FIG. 2.

The central control unit 108 is configured as a centralized controller that enables information to transfer between the subsystems 202 over a vehicle network 204. By exchanging information with the subsystems 202, the centralized controller causes the execution of subsystem functions that enable driving. For instance, the central control unit 108 receives signals output on the network 204 from one of the subsystems 202, and based on information inferred from the signals, the central control unit 108 outputs additional signals on the network 204 to cause a particular behavior of another of the subsystems 202.

In accordance with the described techniques, the central control unit 108 includes a first processor 208 and a second processor 210. The first processor 208 and the second processor 210 represent separate processors, processor cards, processor cores, control units, microcontrollers, system on chips, or other processor technology. Each of the first processor 208 and the second processor 210 are configured to execute instructions either as software or firmware to implement functionality of the central control unit 108. Although not shown, in some examples, the central control unit 108 includes a non-transitory computer-readable storage medium (e.g., data store, cache, static memory, dynamic memory, flash memory, or disk storage) that maintains the instructions and data for implementing the instructions executed by each of the first processor 208 and the second processor 210. For example, the first processor 208 and the safety processor 210 include respective data stores that contain the instructions retrieved from the data stores and executed during operation of the vehicle 102.

In at least one variation, the central control unit 108 is distributed throughout the vehicle system 200 in two or more locations. In such a distributed implementation, the first processor 208 is included in a first control system and the second processor 210 is included in a second control system. In other distributed implementations, each control system includes one or more processors.

In one or more examples, the first processor 208 and the second processor 210 are functionally redundant. The vehicle system 200 relies on either the first processor 208 or the second processor 210 (e.g., one at a time) to actively cause operations to be performed by the subsystems 202. For example, while the first processor 208 is orchestrating operations of the subsystems 202, the second processor 210 is maintained in a ready, standby state. Notably, in this ready standby state, the second processor 210 also runs as if it is operating the vehicle, e.g., making vehicle control and vectoring decisions as if it is responsible for operating the vehicle in real-time.

If the first processor 208 fails, then the central control unit 108 activates the second processor 210 to seamlessly take over and manage the subsystems 202 where the first processor 208 left off. In some cases, when the second processor 210 takes over, the vehicle 102 is forced to operate in a safe state, which includes autonomously maneuvering away from other vehicles, objects, and pedestrians to come to a controlled stop. This way, the functional redundancy implemented by the first processor 208 and the second processor 210 help the central control unit 108 to satisfy ASIL-D requirements for reliability and safety. In such implementations, the first processor 208 and the second processor 210 are located at different locations within the vehicle.

The vehicle network 204 represents any suitable vehicle network technology, including wired and wireless signal propagation mediums. The vehicle network 204 enables real-time data exchange, safety enhancements, and efficient traffic management among the components of the vehicle system 200. The vehicle network 204 includes various switches, routers, transceivers, controllers, chokes, filters, terminations, and other networking equipment beyond transmission lines, cables, wires, buses, and other signal routing technologies. In at least one implementation, the vehicle network 204 adheres to an in-vehicle networking protocol. For example, the vehicle network 204 represents a combination of one or more of a controller area network (CAN), an automotive ethernet network (AEN), serializer/deserializer (SerDes) network, local interconnect network (LIN), or a FlexRay network (FRN), to name a few.

In at least one example, to implement the redundancy of the central control unit 108, the vehicle network 204 is composed of dual physical network paths. A network path 212 communicatively couples each of the subsystems 202 to the first processor 208. A separate network path 214 communicatively links each of the subsystems 202 to the second processor 210. For example, if a failure at the first processor 208 is at least partially caused by a fault in the network path 212, the second processor 210 is unaffected by the network fault and operable to communicate with the subsystems 202 using the network path 214. The functional redundancy implemented by the network paths 212 and 214 further helps the central control unit 108 to satisfy the ASIL-D requirements for reliability and safety.

In at least one other example, to implement the redundancy of the central control unit 108, the vehicle network 204 is composed of dual logical network paths. The network path 212 and the network path 214 are separate logical paths through the vehicle network 204 that communicatively link each of the subsystems 202 to the first processor 208 and the second processor 210 using the same physical wires. For example, communications to and from the first processor 208 and the second processor 210 are interleaved on a single set of wires that make up the vehicle network 204. If a failure at the second processor 210 and/or the network path 214 occurs, communications from the first processor 208 reach the subsystems 202 using the network path 212. The functional redundancy implemented by interleaving the network paths 212 and 214 further helps the central control unit 108 to satisfy the ASIL-D requirements for reliability and safety.

The subsystems 202 include one or more edge devices operatively coupled to the vehicle network 204 to provide information to the central control unit 108 and receive commands from the central control unit 108 to implement various vehicle functions. For example, each of the subsystems 202 includes one or more actuators, microcontrollers, machines, or other equipment to perform specific vehicle tasks at the discretion of the edge devices that are contained within the subsystems 202.

In one or more implementations, the vehicle includes a subsystem 202-1 which is a propulsion or drive subsystem. Motor/engine devices 216 of the subsystem 202-1 represent edge devices managed by the central control unit 108 to command vehicle propulsion units (e.g., an engine or a motor) to execute driving functions of the vehicle 102 (e.g., forward motion, reverse motion, acceleration, or deceleration). In one or more examples, the motor/engine devices 216 manage operations of an engine of the vehicle 102, including fuel injection, ignition timing, emissions control, and engine health monitoring. In at least one aspect (e.g., in context of electric vehicles), the motor/engine devices 216 control inverters and motors that convert electric energy into mechanical energy for applying torque to wheels.

In addition, the subsystem 202-1 includes gearbox devices 218. Also referred to as a powertrain control module (PCM) and/or a transmission control module (TCM), transmission and gearbox functions are overseen by the gearbox devices 218 to implement an automatic transmission, optimize gear changes (e.g., gear shifts), and control torque delivered to the wheels of the vehicle 102. In variations, a vehicle includes one or more subsystems 202-1, e.g., one subsystem 202-1 for each axle.

A subsystem 202-2 is a human machine interface (HMI) subsystem. The subsystem 202-2 includes one or more HMI control devices 220 that implement a vehicle user interface. The vehicle user interface enables interaction between occupants (e.g., a driver or a passenger) of the vehicle 102 and the vehicle system 200, which enables human intervention in vehicle functions and driving. For example, the HMI control devices 220 control vehicle displays, vehicle dash clusters, heads-up display units, haptic feedback, audible feedback, and other visual driving aids interpreted by the occupants to help with driving or ensuring safe vehicle operations. In one or more implementations, the HMI control devices 220 provide a human-interface to effect climate controls (e.g., heating or cooling), cabin features (e.g., infotainment or lighting), and other vehicle body features (e.g., windshield wipers, transmission settings, suspension settings, drive mode selection, power seating, power mirrors, power door locks, etc.).

The subsystem 202-2 also includes one or more remote control devices 222 that allow human or machine inputs to control the vehicle 102 from outside the cabin. For example, in an autonomous or semi-autonomous vehicle context, the remote control devices 222 receive commands over a communication link with a base station (e.g., a mobile phone, a key fob, or a remote computing system) to allow a human or machine operator to control the vehicle 102 as if the driving commands are provided directly to the HMI control devices 220. In hot or cold weather, to pre-cool or pre-heat the cabin, the remote-control devices 222 are able to activate remote starting functions. The remote-control devices 222 in at least one aspect allow door locks to be locked or unlocked and doors, tailgates, or trunks to be remotely opened or closed.

A subsystem 202-3 represents a braking subsystem of the vehicle system 200. For example, one or more brake control devices 224 are operable to manage anti-lock braking systems (ABS), electronic stability controls (ESC), and otherwise convert driver inputs at the HMI control devices 220 to effect performance of vehicle brakes (e.g., for stopping, for decelerating, etc.). In some examples, the brake control devices 224 represent a braking control module (BCM).

Another of the subsystems 202 depicted in FIG. 2 is subsystem 202-4, which is an onboard-vehicle communication subsystem. The subsystem 202-4 manages telematics and communications that occur within the vehicle 102, and with other devices located outside the vehicle 102. For example, the subsystem 202-4 interfaces with the various edge devices coupled to the vehicle network 204 to ensure healthy exchange of data that is free of errors or faults. In addition, the subsystem 202-4 interfaces with other vehicles, mobile devices, infrastructure, and remote computing systems to implement various vehicle functions. One or more network control devices 228 of the subsystem 202-4 monitor network health of the vehicle network 204 and facilitate communication protocols implemented therein. The network control devices 228 are configured to diagnose problems with the vehicle network 204 to reroute signals and prevent data loss.

One or more telematic devices 226 of the subsystem 202-4 handle offboard communications of the vehicle 102. This includes implementing vehicle-to-vehicle (V2V) and vehicle-to-everything (V2X) communications that enable the vehicle 102 to communicate with other intelligent vehicles and systems in an operating environment, e.g., on or near a roadway. The telematic devices 226 interface with over-the-air (OTA) update services to update software on the vehicle 102, such as the application 114 and/or firmware or software executed by the first processor 208 and/or the second processor 210, e.g., a vehicle operating system. In addition, the telematic devices 226 interface with a positioning system to assist with navigation functions. Other features implemented by the telematic devices 226 include remote diagnostics and interfacing with emergency response services (e.g., to automatically alert emergency responders in the event of an accident).

Subsystem 202-5 is an advanced driving and safety (ADAS) subsystem of the vehicle system 200. In at least one implementation, the subsystem 202-5 has two main functions, including implementing an ADAS as well as a perception sensor system. For example, one or more ADAS control devices 230 implement ADAS functionality that includes autonomous or semi-autonomous control, adaptive cruise control, emergency braking, lane centering, and other ADAS functions. One or more perception sensor devices 232 support the ADAS control devices 230 by providing information about the driving environment to ensure safe driving. For example, a radar, a camera, a lidar, an ultrasonic sensor, a global position system (GPS) sensor, an inertial measurement unit (IMU), and other sensor technology is deployed by the perception sensor devices 232 to collect sensor data about a vehicle environment. Sensor fusion techniques, object detection, lane centering, path trajectory planning, and other perception sensor functions are executed by the perception sensor devices 232 to enable the ADAS functions performed by the ADAS control devices 230.

Subsystem 202-6 is a steering subsystem that controls components of the vehicle which steer the wheels. One or more steer control devices 234 integrate with an electric power steering system of the vehicle 102 to control direction of the vehicle wheels. The steer control devices 234 receive inputs from the HMI control devices 220 and/or the central control unit 108, which are translated into appropriate steering commands for controlling steering actuators that change the direction of the wheels for steering and performing evasive maneuvers.

Subsystem 202-7 represents a body control subsystem of the vehicle 102. Included in the subsystem 202-7 are one or more body control devices 236, which handle functions related to vehicle body controls. For example, window actuators, door locks and latches, interior and exterior lighting, tailgate and trunk latches, and the like are controlled by the body control devices 236 at the command of the central control unit 108 and/or one or more of the other subsystems 202 (e.g., the HMI control devices 220).

Subsystem 202-8 is an active suspension control subsystem. One or more suspension control devices 238 implement functions of a suspension control module (SCM) to regulate suspension components to adjust a ride level of the vehicle 102. For example, the suspension control devices 238 configure a vehicle suspension to be stiffer on paved surfaces for improved driving performance and maneuverability. In an offroad setting, though, the suspension control devices 238 enable a softer suspension setting to provide a smoother ride.

Subsystem 202-9 represents a battery management subsystem of the vehicle 102. One or more battery management devices 240 monitor performance of a battery pack (also referred to as a traction battery) to ensure appropriate charging and discharging rates to promote longevity and overall battery health. The battery management devices 240 control charging operations of onboard vehicle batteries as well as controlling battery usage, e.g., to control a rate of discharge. The battery management devices 240 monitor health of vehicle batteries to alert the central control unit 108 when a malfunction is imminent or occurring.

Finally, subsystem 202-N is depicted in FIG. 2, which represents a power distribution system. In variations, one or more power distribution devices 242 of the subsystem 202-N manage the distribution of electrical power from energy sources on the vehicle 102 to the vehicle system 200. For example, the power distribution devices 242 control power switches, inverters, converters, and other electrical distribution components to ensure the subsystems 202 receive an appropriate level of current and voltage for implementing vehicle functions. The power distribution devices 242 includes fault protection circuits and/or breakers to interrupt power to a faulty subsystem and maintain safe electrical conditions while the vehicle 102 remains active. The power distribution devices 242 interface with the motor engine devices 216 and the battery management devices 240 to manage safe electrical conditions throughout the vehicle system 200.

Also shown in FIG. 2, the first processor 208 and the second processor 210 each include separate instances of a data safety unit, labeled as data safety unit 244 and data safety unit 246, respectively. The data safety unit 244 and the data safety unit 246 are examples of the data safety unit 112. The data safety unit 244 and the data safety unit 246 are each operable to intercept network communications to verify integrity of the data and cause actions on the intercepted data to ensure vehicle operations respond according to a fail-operational strategy in response to any faults detected with the data.

Figure 3:
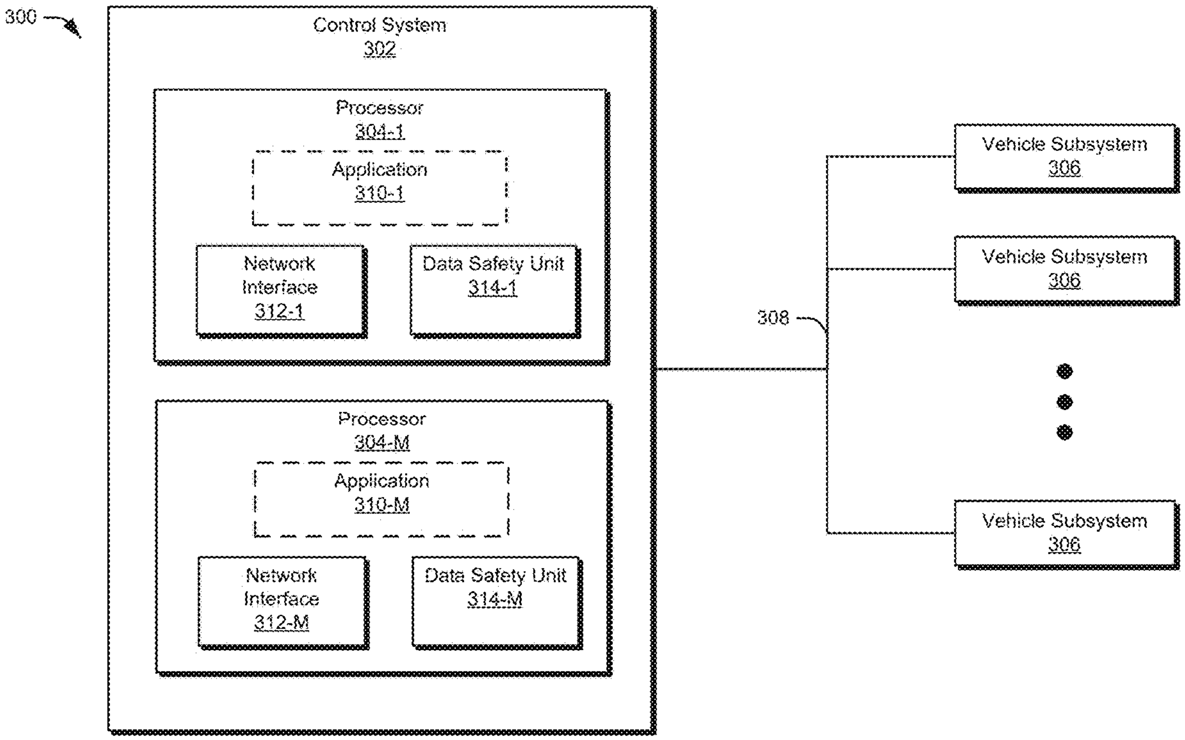
FIG. 3 is a block diagram of a non-limiting example of a vehicle system that implements a data safety observer system.

FIG. 3 is a block diagram of a non-limiting example of a vehicle system 300 that implements a data safety observer system. For ease of description, the vehicle system 300 is described in the context of the environment 100 of FIG. 1 and/or the vehicle system 200 of FIG. 2, including with reference to similar labeled elements.

The vehicle system 300 includes a control system 302 that has multiple processors configured to redundantly control steering and motion operations of a vehicle (e.g., the vehicle 102) including to redundantly manage power being distributed throughout the vehicle system 300 to enable these operations. For example, the control system 302 includes processors 304-1 and 304-M with each being examples of the processor 110, the processor 208, and the processor 210.

Each of the processors 304-1 and 304-M is configured to manage a same group of vehicle subsystems 306 (e.g., the vehicle subsystems 106 or the vehicle subsystems 202) that implement the vehicle operations. The processors 304-1 and 304-M communicate over network channels to exchange control signals and subsystem data with the vehicle subsystems 306. In this way, the processors 304-1 and 304-M redundantly control each of the vehicle subsystems 306 based on communications exchanged over the vehicle network 308.

The processors 304-1 and 304-M are electronic circuits that process instructions for executing applications, labeled as application 310-1 and application 310-M (e.g., application 114 or control routines) on the vehicle 102. Processor execution of the applications 310-1 and 310-M enables the processors 304-1 and 304-M to manage vehicle operations implemented by the vehicle subsystems 306 for causing smooth and safe driving by the vehicle 102. Each of the vehicle subsystems 306 likewise includes one or more processors, which are electronic circuits that process instructions for executing subsystem functions on the vehicle 102. Processor execution of the subsystem functions enables the vehicle subsystems 306 to implement vehicle operations managed by the processors 304-1 and 304-M for achieving smooth and safe driving by the vehicle 102.

In one or more implementations, the processors 304-1 and 304-M include same hardware technology. For example, the processor 304-1 and the processor 304-M have identical processor technology. In one or more other implementations, the processors 304-1 and 304-M include different hardware configurations that implement at least some of the same functionality. For example, the processor 304-1 and the processor 304-M have different processor technology configured to execute similar functioning control routines but removes or lessens a possibility of a systemic fault caused by two near-identical hardware implementations failing for similar reasons at approximately the same time due to a latent fault. In one or more implementations, the processors 304-1 and 304-M execute same software, functionally similar software, or deliberately different software to achieve diversity of implementation. For example, the processors 304-1 and 304-M execute different software, which is functionally similar, but removes or lessens a possibility of a systemic fault caused by two near-identical software applications failing in a similar manner, at approximately the same time, due to a latent fault.

The processors 304-1 and 304-M and/or the vehicle subsystems 306 further include a memory that stores instructions for execution by the processors to redundantly control the vehicle operations or implement vehicle functions in furtherance of the vehicle operations. For example, the processors 304-1 and 304-M and/or the vehicle subsystems 306 each include a memory circuit that stores instructions and data for executing a program (e.g., software or firmware). In one or more implementations, the memory corresponds to semiconductor memory where data is stored within memory cells on one or more integrated circuits. The respective memory of each of the processors 304-1 and 304-M and/or the vehicle subsystems 306 is used to store information, such as for immediate output to the vehicle network 308.

Each of the processors 304-1 and 304-M controls the motion and vectoring of the vehicle 102. In other words, the processors 304-1 and 304-M maintain an operating state of the vehicle 102 (e.g., the vehicle's position and location) to be within a safe operating envelope of the vehicle 102. In such implementations, the processors 304-1 and 304-M are configured to redundantly operate the vehicle 102. For example, the processor 304-1 receives the same inputs from the vehicle subsystems 306 as the processor 304-M. The processor 304-1 outputs the same motion control commands to the vehicle subsystems 306 as the processor 304-M. The processor 304-1 and the processor 304-M performs the same vectoring computations, and so forth. In this way, in the event the processor 304-1 fails, the processor 304-M seamlessly assumes control of the vehicle 102.

Due to the redundancy achieved by the control operations executed by each of the processors 304-1 and 304-M, the vehicle subsystems 306 follow one set of control operations and utilize each redundant set of control operations as a back-up set of commands or signals to follow in case of a failure with the central control unit that generated the first set.

The processors 304-1 and 304-M include network interfaces labeled as network interface 312-1 and network interface 312-M. Network interfaces 312-1 and 312-M are operable to transmit and receive data via the vehicle network 104 and communication networks internal to the control system 302 (e.g., serial peripheral interfaces (SPI)).

The processors 304-1 and 304-M also include data safety units labeled as data safety unit 314-1 and data safety unit 314-M. The data safety units 314-1 and 314-M are hardware implementations of a rationality and plausibility safety engine. Each of the data safety units 314-1 and 314-M receive data (e.g., the parameter data 116-1) from the respective applications 310-1 and 310-M. Due to the possibility of the data being corrupted due to software glitches or hardware faults, the data safety units 314-1 and 314-M check the integrity of the data based on different factors such as correlation, plausibility, rationality, and/or proportionality. If the data satisfies the integrity check, the data passes through the data safety units 314-1 and 314-M unmodified, otherwise, the data safety units 314-1 and 314-M modify the data to maintain a safety envelope around the vehicle. In some cases, the data safety units 314-1 and 314-M also indicate the status of the safety check, and if the data did not satisfy the integrity check, a reason the data did not satisfy the integrity check. In this manner, the control system 302 has the ability to fail-operational and still execute a high level safety goal.

Figure 4:
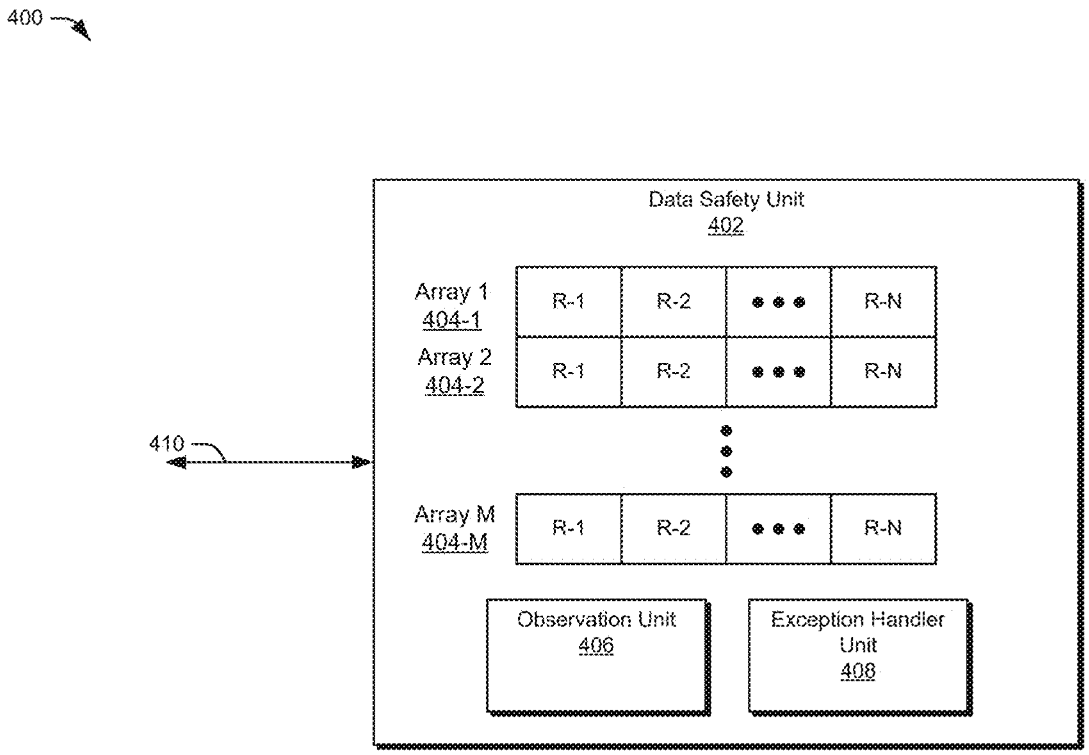
FIG. 4 is a block diagram of a non-limiting example of a data safety observer system for safe vehicle operation.

FIG. 4 is a block diagram of a non-limiting example of a data safety observer system 400 for safe vehicle operation. The data safety observer system 400 includes a data safety unit 402, which is an example of data safety unit 112 and data safety units 314-1 and 314-M. In some implementations, the data safety unit 402 is included in a processor semiconductor package (e.g., similar to a floating point unit). In other implementations, the data safety unit 402 is packaged as a separate semiconductor chip.

The data safety unit 402 includes multiple arrays of registers labeled as an array of registers 404-1, an array of registers 404-2, and an array of registers 404-M, an observation unit 406, and an exception handler unit 408. As parameter data (e.g., the parameter data 116-1) is received by the data safety unit 402 from a control routine (the application 114 or the applications 310-1 and 310-M) via a network 410, it is stored as mirror copies in each of the array of registers 404-1, the array of registers 404-2, and the array of registers 404-M. The array of registers 404-1, the array of registers 404-2, and the array of registers 404-M each operate in a lockstep process that compares the value of each data point stored in one of the array of registers 404-1, the array of registers 404-2, and the array of registers 404-M with the respective data points stored in each of the other arrays of registers 404-1, the array of registers 404-2, and the array of registers 404-M. This process filters out parameter data that has been corrupted due to hardware faults internal to the data safety unit 402 that in certain cases is otherwise undetected.

The observation unit 406 is operable to implement an integrity check of the parameter data based on values of the parameter data stored within the array of registers 404-1, the array of registers 404-2, and the array of registers 404-M. The observation unit 406 includes a semiconductor implementation of logic that evaluates the integrity of each data point stored in each register of each of the array of registers 404-1, the array of registers 404-2, and the array of registers 404-M. This integrity check is based on one or more factors related to proportionality, plausibility, rationality, or correlation of the parameter data. The integrity check verifies whether portions of the parameter data satisfy an acceptable range of values associated with the parameter data, satisfies an acceptable change in values relative to previous values obtained from corresponding portions of previous parameter data, and/or satisfies a minimum or maximum value associated with the parameter data. In some cases, the integrity check includes comparing the parameter data values to predetermined configuration data. The configuration data includes threshold values, range limits, and/or set values determined to be operationally safe for the parameter data. This configuration data is preprogrammed into a non-volatile memory such as a ROM or an EEPROM. Alternatively, the configuration data is loaded at boot time and is RAM-based, such as from a data integrity table.

Upon finding parameter data that does not satisfy the integrity check, the observation unit 406 modifies the parameter data to increase the likelihood of maintaining safety envelope for the vehicle. The observation unit 406 modifies the parameter data by clipping the invalid parameter data to a threshold value, setting the invalid parameter data to a fixed value, or setting the invalid parameter data to a previous value of the parameter data that satisfied the integrity check. In some cases, the modified parameter data is latched into the respective register until future instances of the parameter data return to a safe range. In cases where the parameter data satisfies the integrity check, the observation unit 406 refrains from modifying the parameter data. Once the integrity check is completed and any modifications are made, the parameter data is output back to the control routine.

The exception handler unit 408 is operable to output data via the network 410 that indicates whether the parameter data stored within the array of registers satisfies the integrity check. This data takes the form of an exception. In one or more examples, the exception likewise indicates modified values of portions of the parameter data and/or a reason a portion of parameter data was modified. A source of the parameter data uses this feedback to adjust its execution, including to correct the parameter data for subsequent outputs to the vehicle network 410.

Figure 5:
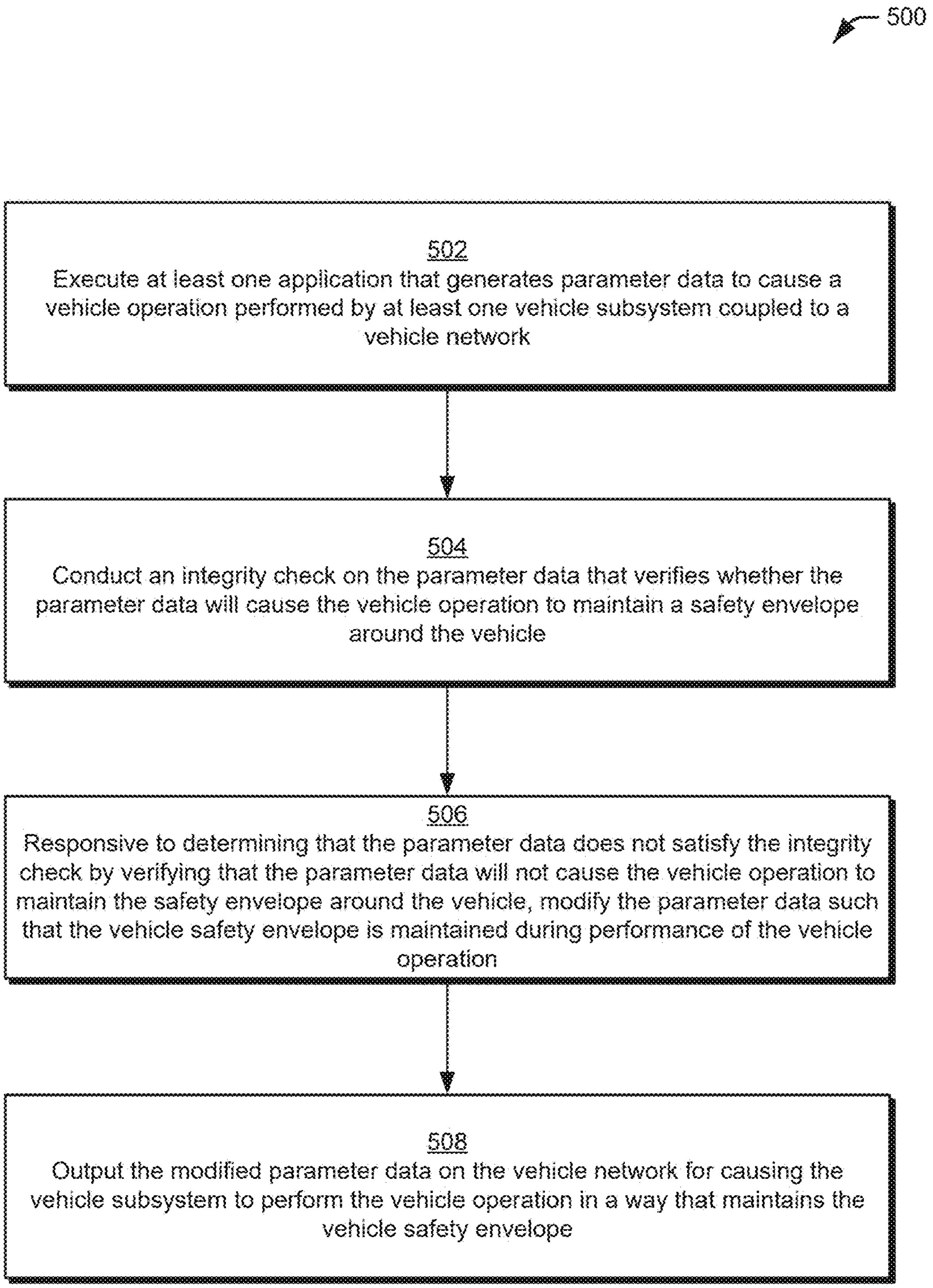
FIG. 5 depicts a procedure for implementing a data safety observer system for safe vehicle operation.

FIG. 5 depicts a procedure 500 for implementing a data safety observer system for safe vehicle operation. The procedure 500 includes multiple operations illustrated as block 502 through block 508 and provides just one example procedure performed within any of the previously described systems (e.g., the vehicle 102, the vehicle system 200, the vehicle system 300, or the vehicle system 400). The procedure 500 is not limited to the order of operations shown in FIG. 5, other orderings of the block 502 through the block 508 are possible. In one or more implementations, the procedure 500 includes additional or fewer operations than those depicted in FIG. 5.

The procedure 500 starts with at least one application being executed by a processor communicatively coupled to a vehicle network (block 502). The application, when executed, generates parameter data to cause a vehicle operation performed by at least one vehicle subsystem coupled to the vehicle network. For example, the processor 110 executes the application 114, which in turn, generates parameter data 116-1 to cause one or more of the vehicle subsystems 106 to perform a vehicle operation.

Next, an integrity check is conducted on the parameter data that verifies whether the parameter data will cause the vehicle operation to maintain a safety envelope around the vehicle (block 504). For example, the processor 110 determines, through the data safety unit 112, whether the parameter data 116-1 satisfies the integrity check. The integrity check verifies the rationality and plausibility of the parameter data 116-1 for maintaining safe operations by the vehicle subsystems 106.

Responsive to determining that the parameter data does not satisfy the integrity check by verifying that the parameter data will not cause the vehicle operation to maintain the safety envelope around the vehicle, the parameter data is modified by the processor such that a vehicle safety envelope is maintained during performance of the vehicle operation (block 506). For example, if the data safety unit 112 within the processor 110 determines the parameter data 116-1 does not satisfy the integrity check, the parameter data

116-1 is modified by the data safety unit 112 to be the parameter data 116-1 such that a vehicle safety envelope is maintained during performance of the vehicle operation. If the parameter data 116-1 is determined to satisfy the integrity check, the data safety unit 112 refrains from modifying the parameter data 116-1.

The modified parameter data is then output on the vehicle network by the processor for causing the vehicle subsystem to perform the vehicle operation in a way that maintains the vehicle safety envelope (block 508). For example, once the data safety unit 112 modifies the parameter data 116-1, the application 114 being executed by the processor 110 outputs the modified parameter data 116-2 on the vehicle network 104. This action causes one or more of the vehicle subsystems 106 to perform the vehicle operation in a safe manner.

Many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the vehicle subsystems 106, the central control unit 108, the processor 110, the data safety unit 112, the vehicle subsystems 202, the processors 208 and 210, the data safety unit 244, the data safety unit 246, the processors 304-1 and 304-M, the vehicle subsystems 306, the data safety units 314-1 and 314-M, the data safety unit 402, the array of registers 404-1, the array of registers 404-2, and the array of registers 404-M, the observation unit 406, the exception handler unit 408) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a DSP, a GPU, a parallel accelerated processor, a plurality of microprocessors, one or more microprocessors in association with a DSP core, a controller, a microcontroller, Application Specific Integrated Circuits (ASICs), FPGAs, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a ROM, a RAM, a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:

executing, by a processor communicatively coupled to a vehicle network, at least one application that generates parameter data to cause a vehicle operation performed by at least one vehicle subsystem coupled to the vehicle network;

conducting, by the processor using a data safety unit coupled to the processor, an integrity check on the parameter data that verifies whether the parameter data will cause the vehicle operation to maintain a safety envelope around the vehicle by storing mirror copies of the parameter data in multiple arrays of registers included in the data safety unit and determining whether each of the mirror copies of the parameter data satisfies the integrity check;

responsive to determining that the parameter data does not satisfy the integrity check by verifying that the parameter data will not cause the vehicle operation to maintain the safety envelope around the vehicle, modifying, by the processor, the parameter data such that the vehicle safety envelope is maintained during performance of the vehicle operation; and outputting, by the processor, the modified parameter data on the vehicle network for causing the vehicle subsystem to perform the vehicle operation in a way that maintains the vehicle safety envelope.

2. The method of claim 1, the method further comprising:

responsive to determining that additional parameter data satisfies the integrity check by verifying that the additional parameter data will cause the vehicle operation to maintain the safety envelope around the vehicle, refraining, by the processor, from modifying the additional parameter data; and outputting, by the processor, the additional parameter data on the vehicle network for causing the vehicle subsystem to perform the vehicle operation.

3. The method of claim 1, wherein causing the vehicle subsystem to perform the vehicle operation in a way that maintains the vehicle safety envelope includes performing at least one minimum risk maneuver that results in a minimum safe condition of the vehicle.

4. The method of claim 1, further comprising:

using, by the processor, the data safety unit to intercept the parameter data prior to being output on the vehicle network, wherein determining whether the parameter data satisfies the integrity check includes causing the data safety unit to perform the integrity check on the intercepted parameter data.

5. The method of claim 1, wherein determining whether the parameter data satisfies the integrity check further includes:

responsive to storing the mirror copies of the parameter data within the multiple arrays of registers, receiving, by the processor, data from the data safety unit that indicates whether the mirror copies of the parameter data stored within the multiple arrays of registers satisfies the integrity check.

6. The method of claim 5, wherein receiving data from the data safety unit includes receiving a reason for the parameter data not satisfying the integrity check, the method further comprising:

notifying, by the processor, the application or the vehicle subsystem about the reason for the parameter data not satisfying the integrity check by outputting an exception on the vehicle network instructing the application or the vehicle subsystem the reason for the parameter data not satisfying the integrity check.

7. The method of claim 1, wherein modifying the parameter data such that the vehicle safety envelope is maintained includes at least one of:

clipping a portion of the parameter data to a threshold value for maintaining the vehicle safety envelope;

setting a portion of the parameter data to a fixed value for maintaining the vehicle safety envelope; or setting a portion of the parameter data to a previous value of the parameter data that satisfied the integrity check.

8. The method of claim 1, wherein determining whether the parameter data satisfies the integrity check includes using one or more of a predetermined rationality, plausibility, proportionality, or correlation factor to verify whether at least one of:

portions of the parameter data satisfy an acceptable range of values associated with the parameter data;

the portions of the parameter data satisfy an acceptable change in values relative to previous values obtained from corresponding portions of previous parameter data; or the portions of the parameter data satisfy a minimum value or a maximum value associated with the parameter data.

9. A system comprising:

at least one vehicle subsystem configured to perform at least one vehicle operation based on parameter data received from a vehicle network; and a processor communicatively coupled to the vehicle network and operable to:

execute at least one application that generates the parameter data;

conduct, using a data safety unit coupled to the processor, an integrity check on the parameter data that verifies whether the parameter data will cause the vehicle operation to maintain a vehicle safety envelope around the vehicle by storing mirror copies of the parameter data in multiple arrays of registers of the data safety unit and determining whether each of the mirror copies of the parameter data satisfies the integrity check;

responsive to determining that the parameter data does not satisfy the integrity check by verifying that the parameter data will not cause the vehicle operation to maintain the safety envelope around the vehicle:

modify the parameter data such that the vehicle safety envelope is maintained during performance of the vehicle operation; and output the modified parameter data on the vehicle network for causing the vehicle subsystem to perform the vehicle operation in a way that maintains the vehicle safety envelope; and responsive to determining that the parameter data satisfies the integrity check by verifying that the parameter data will cause the vehicle operation to maintain the safety envelope around the vehicle:

refrain from modifying the parameter data; and output the parameter data on the vehicle network for causing the vehicle subsystem to perform the vehicle operation.

10. The system of claim 9, wherein causing the vehicle subsystem to perform the vehicle operation in a way that maintains the vehicle safety envelope includes performing at least one minimum risk maneuver that results in a minimum safe condition of the vehicle.

11. The system of claim 9, wherein the system further comprises the data safety unit.

12. The system of claim 11, wherein:

the processor and the data safety unit are implemented on a single system on chip; or the processor and the data safety unit are implemented on different chips.

13. The system of claim 11, wherein the data safety unit comprises:

the multiple arrays of registers operable to store the parameter data;

an observation unit operable to implement the integrity check of the parameter data based on values of the parameter data stored within the multiple arrays of registers; and an exception-handler unit operable to output data that indicates whether the parameter data stored within the multiple arrays of registers satisfies the integrity check.

14. The system of claim 13, wherein when the data from the exception-handler unit indicates a reason for the parameter data not satisfying the integrity check, the processor is operable to notify the application or the vehicle subsystem about the reason for the parameter data not satisfying the integrity check by outputting an exception on the vehicle network instructing the application or the vehicle subsystem the reason for the parameter data not satisfying the integrity check.

15. The system of claim 13, further comprising:

latching the modified parameter data in the multiple arrays of registers until the at least one application outputs the parameter data to be within a threshold value.

16. The system of claim 11, wherein the data safety unit modifies the parameter data such that the vehicle safety envelope is maintained includes at least one of:

clipping a portion of the parameter data to a threshold value for maintaining the vehicle safety envelope;

setting a portion of the parameter data to a fixed value for maintaining the vehicle safety envelope; or setting a portion of the parameter data to a previous value of the parameter data that satisfied the integrity check.

17. A processing device comprising:

a processor core including a network interface with at least one subsystem that performs at least one operation based on parameter data received from the processor core; and a data safety unit operatively coupled to the processor core and configured to intercept the parameter data from the network interface to determine whether the parameter data satisfies an integrity check, the processor core being operable to:

execute at least one application that generates the parameter data;

cause the data safety unit to conduct an integrity check on the parameter data that verifies whether the parameter data will cause a safety envelope to be maintained during performance of the operation by storing mirror copies of the parameter data in multiple arrays of registers included in the data safety unit and determining whether each of the mirror copies of the parameter data satisfies the integrity check;

responsive to the parameter data not satisfying the integrity check by verifying that the parameter data will not cause a safety envelope to be maintained during performance of the operation:

modify the parameter data such that a safety envelope is maintained during performance of the operation; and output the modified parameter data to the network interface for causing the subsystem to maintain the safety envelope while performing the operation; and responsive to the parameter data satisfying the integrity check by verifying that the parameter data will cause a safety envelope to be maintained during performance of the operation:

refrain from modifying the parameter data; and output the parameter data to the network interface for causing the subsystem to maintain the safety envelope while performing the operation.

18. The processing device of claim 17, wherein the processing device and the data safety unit are implemented within a single semiconductor package.

* * * * *